Patented June 30, 1942

2,288,334

UNITED STATES PATENT OFFICE 2,288,334

LOCAL ANESTHETIC

Elmer B. Vliet, Lake Bluff, and Marjorie B. Moore, Waukegan, Ill., assignors to Abbott Laboratories, North Chicago, Ill., a corporation of Illinois No Drawing. Application May 3, 1940, Serial No. 333,110

3 Claims. (Cl. 260—471)

The present invention relates to pharmacological products and more particularly to an alkamine ester of an amino, alkoxy benzoic acid characterized by unique local anesthetic properties.

The principal object of the present invention is to provide products selected from the group consisting of the compound gamma-di-n-butylaminopropyl-3-amino-4-n-butyloxy-benzoate and its acid addition salts having improved local anesthetic properties of the type desired.

Other objects will be apparent as the description hereinafter proceeds.

We discovered after an extended research investigation that the gamma-di-n-butylaminopropyl ester of 3-amino-4-n-butyloxybenzoic acid and its salts possessed unique local anesthetic properties. The superior value of the free base and/or its salts is shown by its extremely high efficiency and lack of irritation in concentrations needed for efficient local anesthetic action. The following method of preparation will serve for illustrative purposes:

Example

About 54 grams of 3-nitro-4-n-butyl-oxy-benzoic acid is first converted to the acid chloride by refluxing with about 55 c. c. of thionyl chloride, and after removal of the excess thionyl chloride the acid chloride is reacted with about 42 grams of gamma-di-n-butylamino-propanol in benzene solution. The gamma-di-n-butylaminopropyl - 3 - nitro-4-n-butyloxybenzoate-hydrochloride obtained is then converted, i. e., reduced, to give the gamma-di-n-butylamino-propyl-3-amino-4-n-butyloxybenzoate. The hydrochloride of the free base (prepared by reacting the free base with hydrochloric acid) may be recrystallized from acetone and when purified melts at about 143.5°–144° C. Other salts may be prepared by reacting the base with acids—the following representative examples serving for illustrative purposes:

*Borate.*—This salt may be prepared by reacting the free base with boric acid in acetone solution, evaporating the solvent and recrystallizing the residue from chloroform-petroleum ether. The product obtained melts at about 85°–90° C. and the nitrogen analysis corresponds to the formula $C_{22}H_{38}N_2O_3 \cdot 5HBO_2$.

*Tartrate.*—This salt may be prepared by reacting the free base with tartaric acid in alcohol, or by warming without solvent. The normal tartrate crystallizes with one molecule of $H_2O$, melts at about 98°–100° C. and is very soluble in water and alcohol.

*Acetate.*—This salt may be prepared by reacting the free base with glacial acetic acid in equivalent quantities and allowing the reaction mixture to stand for some time in a vacuum desiccator until the salt finally crystallizes. The crystals obtained after washing with petroleum ether and drying melt at about 57°–60° C.

*Sulfate.*—This salt may be prepared by reacting the free base with sulfuric acid. The product obtained after purifying by solution in ethyl acetate and precipitation from solution by petroleum ether, melts at about 82°–85° C.

The products of the present invention, i. e. the free base and the salts thereof, are of particular value for therapeutic use. Both pharmacological and clinical tests have demonstrated their superior value as local anesthetics, especially for topical application. As a general rule due to improved solubility the product is usually employed in salt form.

It will be understood that the present invention is not limited to the above illustrative examples. All modifications of the present invention are intended to be covered by the following claims.

We claim:

1. Products selected from the group consisting of the compound gamma-di-n-butylaminopropyl-3-amino-4-n-butyloxy-benzoate and its acid addition salts, said products being characterized by local anesthetic properties.

2. The product gamma-di-n-butylaminopropyl-3-amino-4-n-butyloxy-benzoate hydrochloride, said product being characterized by local anesthetic properties.

3. A local anesthetic compound selected from the group consisting of the gamma-di-n-butylaminopropyl ester of 3-amino-4-n-butyloxybenzoic acid and its acid addition salts.

ELMER B. VLIET.
MARJORIE B. MOORE.